United States Patent
Cholleti et al.

(10) Patent No.: US 7,159,094 B1
(45) Date of Patent: Jan. 2, 2007

(54) KERNEL MEMORY DEFRAGMENTATION METHOD AND APPARATUS

(75) Inventors: Udayakumar Cholleti, Cupertino, CA (US); Viswanath Krishnamurthy, Sunnyvale, CA (US); Stan J. Studzinski, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 373 days.

(21) Appl. No.: 10/882,751

(22) Filed: Jun. 30, 2004

(51) Int. Cl.
*G06F 13/00* (2006.01)
(52) U.S. Cl. ...................................... 711/170; 711/165
(58) Field of Classification Search ................. 711/165, 711/170
See application file for complete search history.

(56) References Cited

U.S. PATENT DOCUMENTS 5,897,660 A * 4/1999 Reinders et al. ............ 711/170

* cited by examiner

*Primary Examiner*—Reba I. Elmore
(74) *Attorney, Agent, or Firm*—Martine Penilla & Gencarella, LLP

(57) ABSTRACT

Provided is a method and an apparatus for allocating contiguous chunks of physical address space. Specifically, the contiguous chunks are homogenized by allocating kernel pages from kernel page free lists and user pages from a user page free list. The kernel page free lists are a nonrelocatable kernel page free list and relocatable kernel page free list. The user page free list has free pages that populate the relocatable kernel page free list. Each page that populates the relocatable kernel page free list includes an identifier such that the identifier permits the addition of the page to the relocatable kernel page free list. By providing three types of page free lists, satisfied requests for free pages from the page free lists create contiguous chunks of physical address space.

20 Claims, 7 Drawing Sheets

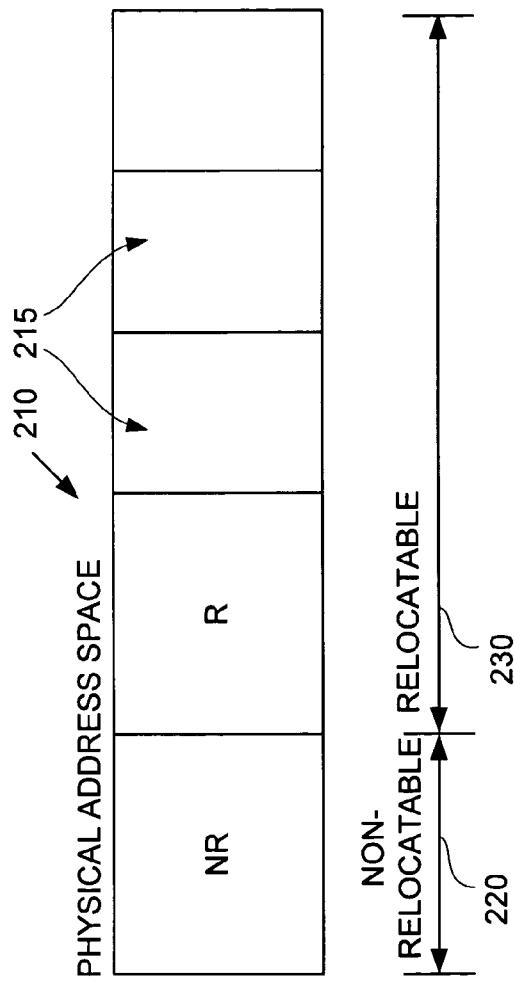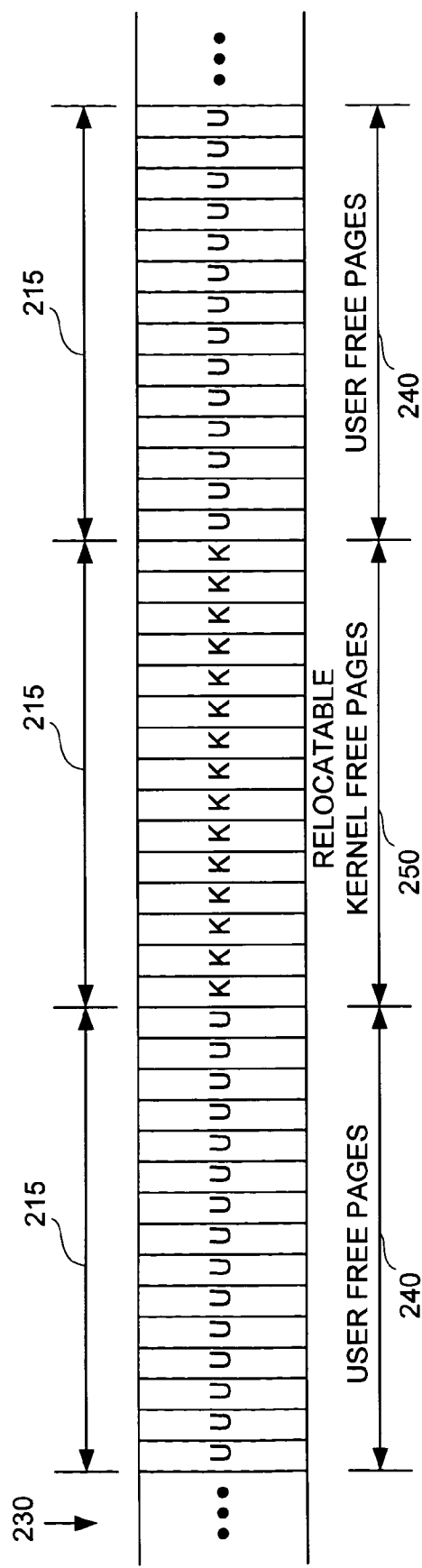

KERNEL MEMORY DEFRAGMENTATION METHOD AND APPARATUS

BACKGROUND

An operating system allocates pages of physical memory to user memory and kernel memory. Within the physical memory, user pages allocated to user memory may be adjacent to kernel pages allocated to kernel memory. Specifically, user pages are physical pages of the physical memory mapped to an address range in a user address space. Kernel pages are physical pages of the physical memory mapped to an address range in a kernel address space.

When the operating system requires contiguous pages of the physical memory, the operating system attempts to create the contiguous pages by relocating pages. For example, if the contiguous pages of physical memory are user pages and kernel pages, then the operating system may attempt to relocate data in the user pages to other user pages located elsewhere in the physical memory. Similarly, the operating may attempt to relocate data in the kernel pages to other kernel pages located elsewhere in the physical memory. The relocation thus creates pages of the contiguous pages that are available for use.

However, the kernel pages are not easily relocated. For example, to relocate a kernel page, processes accessing the kernel page are blocked. Thus, processes accessing the kernel page wait until the data in the kernel pages is relocated and new mappings to a new kernel page are provided to the waiting processes. Although relocating a user page undergoes a similar blocking operation, the processes waiting to access the user page are not kernel-related processes. Typically, kernel-related processes that are blocked reduce the overall performance of the operating system. Accordingly, kernel pages are not relocated unless hardware related to the physical memory the kernel pages reside are replaced.

Instead of relocating pages, another technique to create contiguous pages of physical memory is to shutdown and startup the operating system and computer. During the shutdown, any user applications are gracefully stopped in order to prevent data loss or corruption. In some larger systems, gracefully stopping a user application, such as a database, may require a half an hour in addition to the time required to shutdown the operating system. Then, during the startup of the computer, the operating system and the user applications require time before full access to the user applications is permitted. This startup time may also take a half-hour or more. Thus, if the technique used to create contiguous pages of physical memory is to shutdown and startup the computer, then the entire process for these larger systems may last an hour or more. The downtime of the computer between the initiation of the shutdown and the end of the startup may be unacceptable.

SUMMARY

Embodiments of the present invention provide a method and an apparatus of defragmenting kernel memory. It should be appreciated that the present invention can be implemented in numerous ways, such as a process, an apparatus, a system, a device or a method on a computer readable medium. Several inventive embodiments of the present invention are described below.

In an exemplary embodiment of a method of defragmenting memory, the method includes identifying a chunk of physical address space, the chunk having a plurality of pages. Each page of the plurality of pages is identified by a page frame number. The method also includes creating a relocatable kernel page free list and adding the page frame numbers of each of the plurality of pages from the chunk to the relocatable kernel page free list. Further, the method includes assigning page frame numbers from the relocatable kernel page free list to each request for relocatable kernel pages, such that relocatable kernel pages are assigned to the chunk of physical address space that is to be contiguously populated with relocatable kernel pages.

An embodiment of an apparatus for defragmenting memory includes means for identifying a chunk of physical address space such that the chunk has a plurality of pages. Each page of the plurality of pages is capable of being identified. The apparatus also includes means for creating a relocatable kernel page free list and means for adding the page of each of the plurality of pages from the chunk to the relocatable kernel page free list. Further, the apparatus includes means for assigning a page from the relocatable kernel page free list to each request for relocatable kernel pages, such that relocatable kernel pages are assigned to the chunk of physical address space that is to be contiguously populated with relocatable kernel pages.

In an embodiment of an apparatus for defragmenting memory, the apparatus includes a physical memory logically represented as a physical address space. The physical address space has chunks, such that each chunk includes a plurality of pages. Each page of the plurality of pages is identified by a page frame number. Further, a processor is coupled to the physical memory, such that the processor is in communication with the physical address space. The physical address space is in communication with a relocatable kernel page free list, such that the relocatable kernel page free list is populated by adding the page frame numbers of each of the plurality of pages from the chunk to the relocatable kernel page free list. The apparatus also includes a communication bus coupled to the processor and the physical memory. The physical memory permits the assignment of page frame numbers from the relocatable kernel page free list to each request for relocatable kernel pages such that relocatable kernel pages are assigned to the chunk of physical address space that is to be contiguously populated with relocatable kernel pages.

Other aspects of the invention will become apparent from the following detailed description taken in conjunction with the accompanying drawings, which illustrates by way of example, the principles of the invention.

BRIEF DESCRIPTION OF THE DRAWINGS

FIG. 2A is a diagram illustrating a physical address space of a physical memory for defragmenting kernel memory, in accordance with an embodiment of the invention;

FIG. 2B is a diagram illustrating a relocatable partition of a physical address space, in accordance with an embodiment of the invention;

DETAILED DESCRIPTION

The following embodiments describe a method and an apparatus of defragmenting kernel memory. The method of defragmenting kernel memory enables the organization of contiguous kernel pages, such that chunks of kernel pages are created for use during operation. Thus, a chunk of kernel pages will be available for a memory request, thus avoiding multiple references to access the same amount of pages. It will be obvious, however, to one skilled in the art, that the present invention may be practiced without some or all of these specific details. In other instances, well known process operations have not been described in detail in order not to unnecessarily obscure the present invention.

Figure 1:
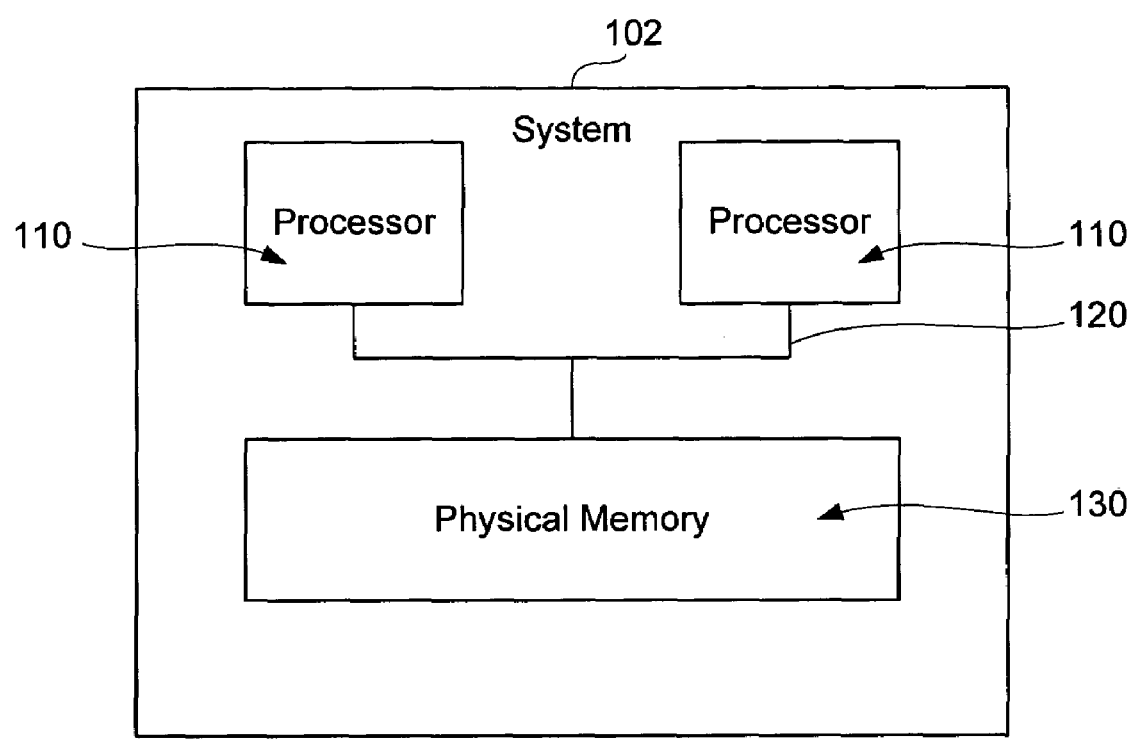
FIG. 1 is a diagram illustrating a system for defragmenting kernel memory, in accordance with an embodiment of the invention.

FIG. 1 is a diagram illustrating a system 102 for defragmenting kernel memory, in accordance with an embodiment of the invention. The system 102 includes at least one processor 110 coupled to a physical memory 130 through a common communication bus 120. The processor 110 includes caches and execution units, in addition to other logic for executing instructions, organized in a core. Processors 110 having multiple cores are called "multi-core" processors. The physical memory 130 has memory cells on multiple memory boards (not shown). Pages, which are logical representations of individual, accessible units of the physical memory 130, contain data. Thus, when the processor 110 loads or stores data in pages, the processor 110 uses the common communication bus 120 to communicate with the physical memory 130.

FIG. 2A is a diagram illustrating a physical address space 210 of the physical memory 130. In accordance with one embodiment, a method to enable the defragmenting of kernel memory will be described below in greater detail. As mentioned above, it is a goal to create chunks of contiguous pages that will be of the same type, and in one example, the type of interest is relocatable kernel pages. The physical memory 130 is managed by the operating system, and the operating system will implement or use the method of the present invention to facilitate the defragmentation of relocatable kernel pages. Specifically, the method of the present invention is part of a memory management subsystem of the operating system.

The operating system logically represents the physical memory 130 as the physical address space 210. Moreover, the physical address space 210 is partitioned into a non-relocatable partition 220 and a relocatable partition 230. The non-relocatable partition 220 contains non-relocatable kernel pages and the relocatable partition 230 will be modified using the method of the present invention to define chunks 215. Each chunk 215 will be defined by contiguous kernel pages. Although chunks 215 are shown one after another, it will be understood that the chunks 215 will be dispersed throughout the physical address space 210, depending on where chunks of user pages can be found. Further, the chunks 215 can have any number of pages. One of ordinary skill in the art will recognize that a number of pages indicated for a chunk 215 of the embodiments described herein are purely exemplary.

Thus, when the kernel of the operating system requires memory, the operating system either allocates a non-relocatable kernel page or a relocatable kernel page. Specifically, the non-relocatable kernel page is mapped to the non-relocatable partition 220 of the physical address space 210. Alternatively, the relocatable kernel page is mapped to the relocatable partition 230 of the physical address space 210. Moreover, the operating system allocates a relocatable user page when a user application, such as a web browser, requires user memory.

As used herein, a "free page" is a page that will not currently have mappings to the page. Mappings are references to the page for loading or storing data. As mentioned above, an operating system will manage references to the free pages, and the method of defragmenting kernel pages will be used by or implemented as part of the operating system.

FIG. 2B is a diagram illustrating the relocatable partition 230 of the physical address space 210, in accordance with an embodiment of the invention. The method of defragmenting kernel pages from user pages will thus establish chunks 215, which either contain user (U) free pages 240 or relocatable kernel (K) free pages 250. Thus, the chunks 215 are said to be homogenous, where pages within the chunks are of the same type.

Figure 3A:
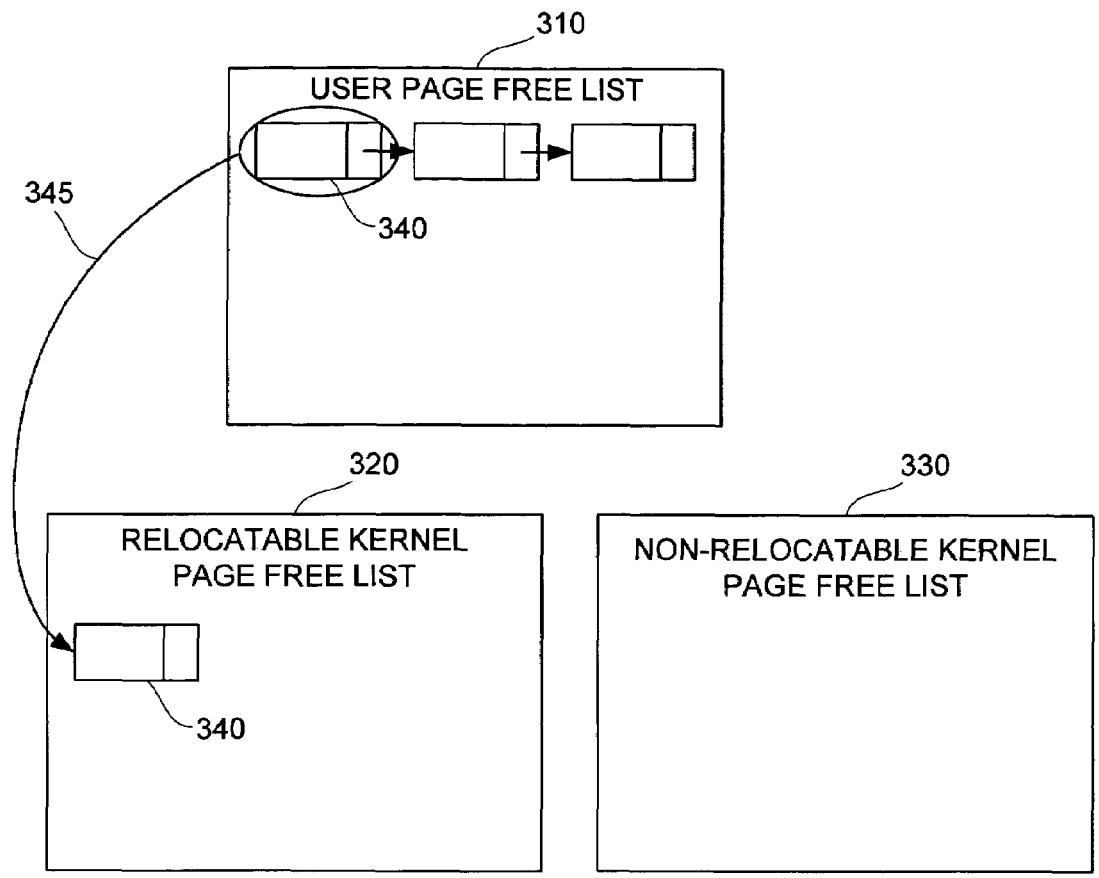
FIG. 3A is a diagram illustrating page free lists for defragmenting kernel memory, in accordance with an embodiment of the invention.

To generate the chunks 215, the method of the present invention uses tables of page free lists. Pages of the chunks 215 are allocated from the tables of page free lists. For example, FIG. 3A is a diagram illustrating page free lists for defragmenting kernel memory, in accordance with an embodiment of the invention. An exemplary embodiment includes table of page free lists, such as a user page free list 310, a relocatable kernel page free list 320, and a non-relocatable kernel page free list 330. Each table of page free lists further includes free pages. For example, the user page free list 310 includes a linked list of free pages. A first page 340 is linked to a second page. The second page is linked to a third page. Subsequent pages are thus linked accordingly.

Further, the user page free list 310 can have any number of free pages, such that the maximum number of pages is the number of pages in the relocatable partition 230. Although one embodiment of a page free list includes a linked list of free pages, other embodiments include other structures than a linked list. For example, an array, tree, or other suitable structure is possible, as long the structure permits the organization of free pages in a page free list.

During the startup of the system 102 (FIG. 1), all pages of the non-relocatable partition 220 (FIG. 2A) are referenced in the non-relocatable kernel free page list 330. Further, all pages of the relocatable partition 230 are referenced in the user page free list 310. However, the relocatable kernel page free list 320 has no references to pages of the physical address space 210. Thus, to begin populating the relocatable kernel page free list 320, the method of the present invention performs a move operation 345. The move operation 345 removes the reference to the first page 340 from the user page free list 310 and adds the reference to the first page 340 to the relocatable kernel page free list 320. During the operation of the system 102, the method of the present invention continues to populate the relocatable kernel page free list 320, thereby obtaining free pages to create chunks 215.

Figure 3B:
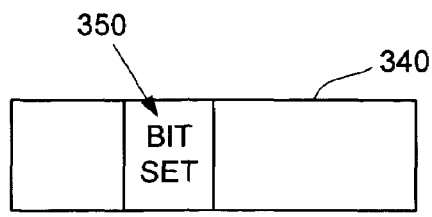
FIG. 3B is a diagram illustrating a page having a relocatable kernel page free list identifier, in accordance with an embodiment of the invention.

To perform the move operation 345, the method of the present invention sets a bit in the first page 340 to indicate that the first page 340 is to be added to the relocatable kernel page free list 320. Specifically, FIG. 3B is a diagram illustrating a page having a relocatable kernel page free list identifier 350, in accordance with an embodiment of the invention. The relocatable kernel page free list identifier 350 can be a bit or any number of bits that allows the method to recognize that the page is to be added to the relocatable kernel page free list 320. Once the identifier is set, the identifier is not reset. Thus, any method of identifying a page to be added to the relocatable kernel page free list 320 is possible, as long as the method allows the setting of the relocatable kernel page free list identifier 350.

Figure 4:
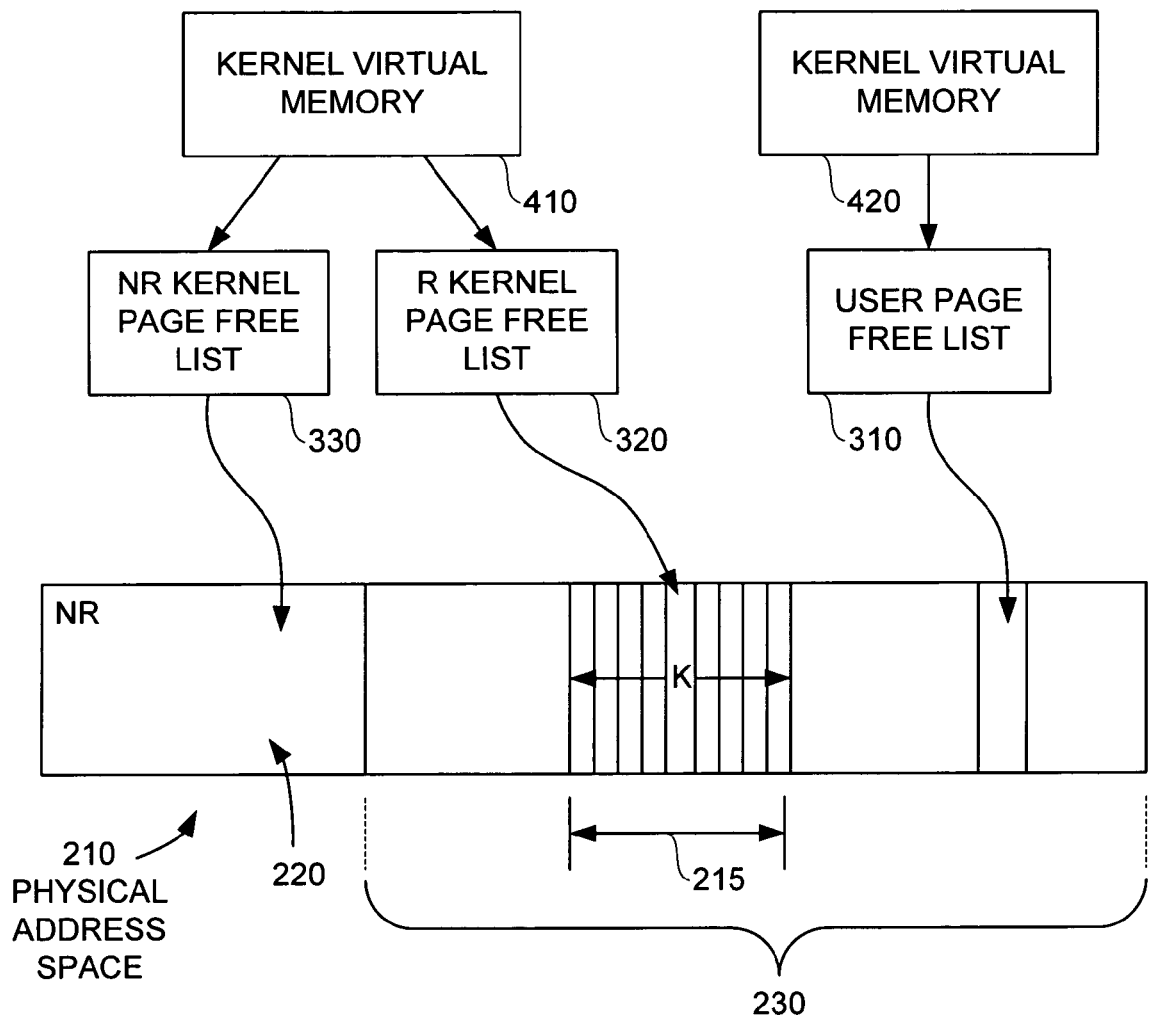
FIG. 4 is a diagram illustrating the use of page free lists for defragmenting kernel memory, in accordance with an embodiment of the invention.

FIG. 4 is a diagram illustrating the use of page free lists for defragmenting kernel memory, in accordance with an embodiment of the invention. A kernel virtual memory 410 is mapped to kernel pages of the physical address space 210 from allocations of pages of the non-relocatable page free list 330 and the relocatable kernel page free list 320. Specifically, free pages of the non-relocatable page free list 330 reference pages of the non-relocatable partition 220. Free pages of the relocatable kernel page free list 320 reference pages of the relocatable partition 230. Using the partitioned physical address space 230, the method achieves kernel memory defragmentation.

To further separate user pages from relocatable kernel pages, chunks 215 of relocatable kernel pages 250 co-exist with other chunks 215 in the relocatable partition 230. To create chunks 215 of user pages, a user virtual memory 420 is mapped to user pages of the physical address space 210 from allocations of pages of the user page free list 310. Thus, by allocating free pages from a specific page free list, the kernel virtual memory and the overall physical address space 230 are defragmented.

Figure 5A:
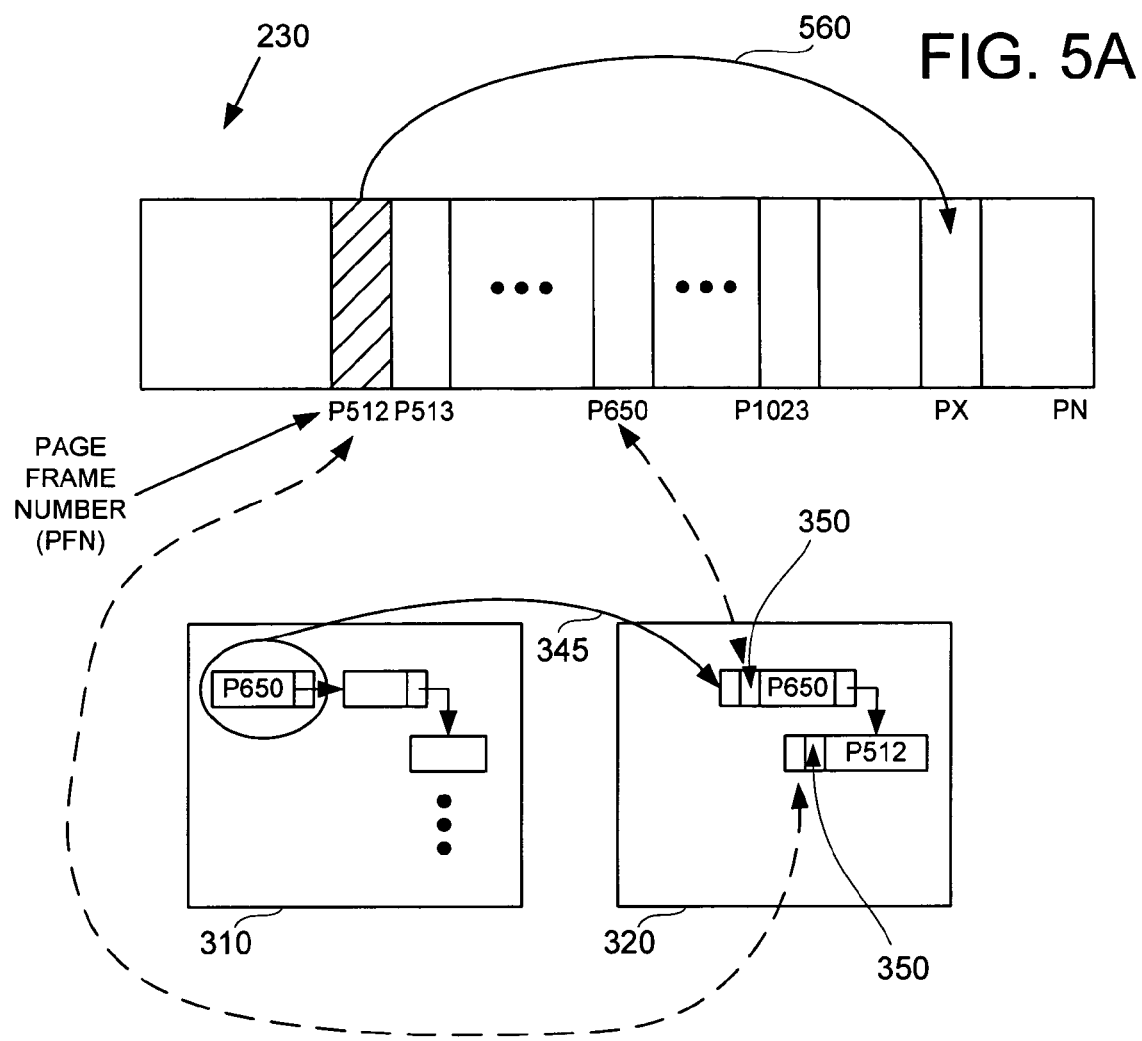
FIG. 5A is a diagram illustrating populating a relocatable kernel page free list, in accordance with an embodiment of the invention.

FIG. 5A is a diagram illustrating populating the relocatable kernel page free list 320, in accordance with an embodiment of the invention. The defragmentation of the kernel virtual memory 410 occurs when the system 102 (FIG. 1) is started. Specifically, the relocatable kernel page free list 320 (FIG. 3A) is created in addition to the user page free list 310 and the nonrelocatable page free list 330. At startup, all pages of the nonrelocatable partition 220 are allocated to the nonrelocatable kernel page free list 330. Further, all pages of the relocatable partition 230 are allocated to the user page free list 310. Thus, all pages are free and are allocated to page free lists.

Next, in the move operation 345, a page of the user page free list 310 is removed. The page is added to the relocatable kernel page free list 320 to begin populating the relocatable page free list 320. The page, identified with a page frame number (P) 650, has the relocatable kernel page free list identifier 350 set. Then, the location of P650 within the physical address space 210 is identified. Provided that an exemplary chunk size is 512 pages, then "650 MOD 512" identifies that the beginning of the chunk is P512 (e.g. 650 MOD 512=138; 650−138=512). "MOD" indicates a modulo operation and is well known to those of ordinary skill in the art. However, any calculation is possible, as long as the result of the calculation identifies the beginning of the chunk 215.

Here, the beginning of the chunk 215 wherein P650 is located is P512. Moreover, because the chunk size is 512 pages, the last page of the chunk 215 is P1023 (i.e. 512+ 512−1). If P512 is free, then P512 is added to the relocatable page free list 320 after setting the relocatable kernel page free list identifier 350. However, if P512 is not free, then the data in P512 is relocated using a relocation operation 560 to another location outside the chunk 215, such as PX. Then, having relocated the data of P512, the page is added to the relocatable kernel page free list 320. Thereafter, each page of the chunk 215 is examined and moved to the relocatable kernel page free list 320. Using this general methodology, the relocatable kernel page free list 320 is populated with free pages, organized as chunks 215. Specific operations for adding pages to the relocatable kernel page free list 320 will be further described in FIG. 6B.

Figure 5B:
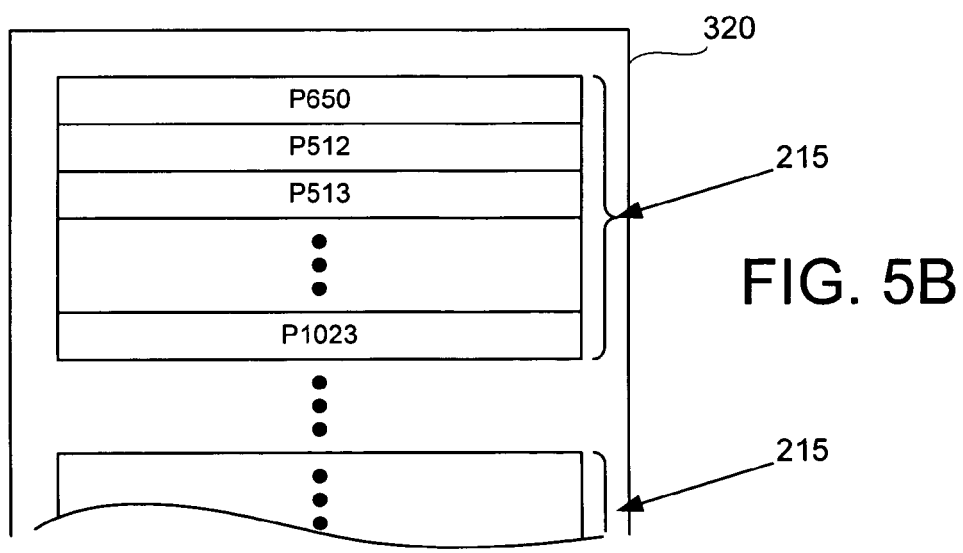
FIG. 5B is a diagram illustrating a relocatable kernel page free list having multiple chunks of memory, in accordance with an embodiment of the invention.

FIG. 5B is a diagram illustrating the relocatable kernel page free list 320 having multiple chunks 215 of memory, in accordance with an embodiment of the invention. After using the general methodology described with reference to FIG. 5A, the relocatable kernel page free list 320 will contain chunks 215 of free pages. Specifically, a first chunk includes free pages from P512 to P1023. A second chunk may contain free pages from 1024 to 1535. Here, as many chunks 215 are created as required by the operating system. When initially populating the chunks 215, there may be page gaps of the chunk 215. The page gaps and the method by which the page gaps are filled are further described in FIG. 6B.

Figure 6A:
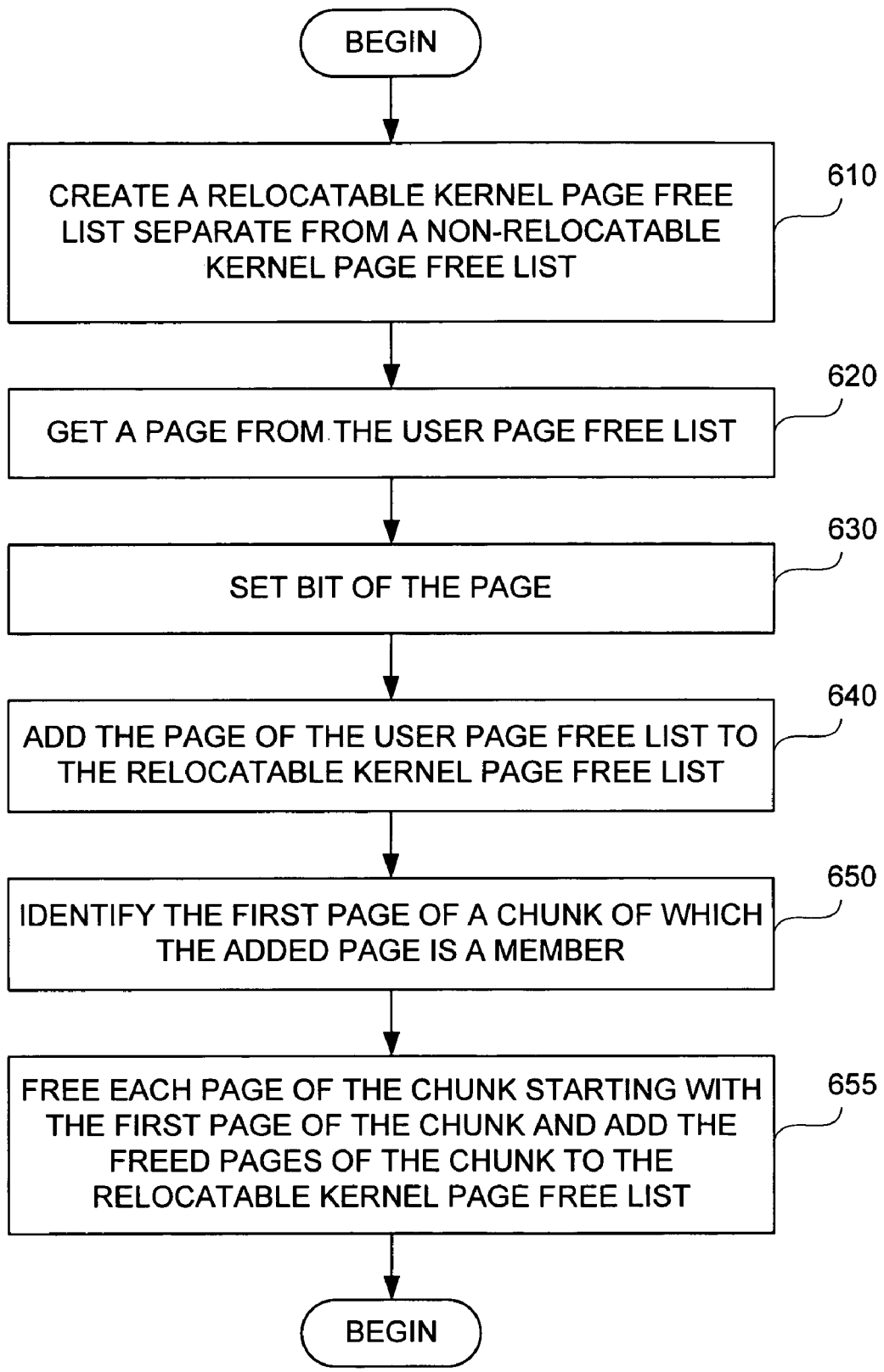
FIG. 6A is a flowchart diagram of creating a relocatable kernel page free list, in accordance with an embodiment of the invention.

FIG. 6A is a flowchart diagram of creating the relocatable kernel page free list 310, in accordance with an embodiment of the invention. Here, exemplary instructions are executed. It should be appreciated that the instructions are stored in the computer system prior to startup, or provided to the computer system during the startup operation. Any method of providing instructions for execution is possible, as long as the instructions create the relocatable kernel page free list.

In operation 610, exemplary instructions create a relocatable page free list separate from a nonrelocatable kernel page free list. Creation of the relocatable kernel page free list does not populate the relocatable kernel page free list with free pages. Thus, in operation 620, instructions get a page from the user page free list. However, before moving the page from the user page free list, instructions of operation 630 set a bit of the page, thereby indicating that the page can be moved to the relocatable kernel page free list.

In operation 640, instructions add the page of the user page free list to the relocatable kernel page free list. Then, in operation 650, instructions identify the first page of the chunk of which the added page is a member. For example, if the page is identified with a page frame number of P199, then the first page of the chunk having 512 pages is P0 (e.g. 199 MOD 512=199; 199−199=0). Beginning with the first page of the chunk, instructions execute operation 655. Specifically, instructions free each page of the chunk starting with the first page of the chunk and add the freed pages of the chunk to the relocatable kernel page free list. Here, freeing a page is defined as ensuring that any mappings to the page are properly handled before adding the page to the relocatable page free list. For example, if the page has data, then the data is relocated before adding the page to the relocatable page free list. The specific methodology for populating the relocatable page free list is illustrated in FIG. 6B.

Figure 6B:
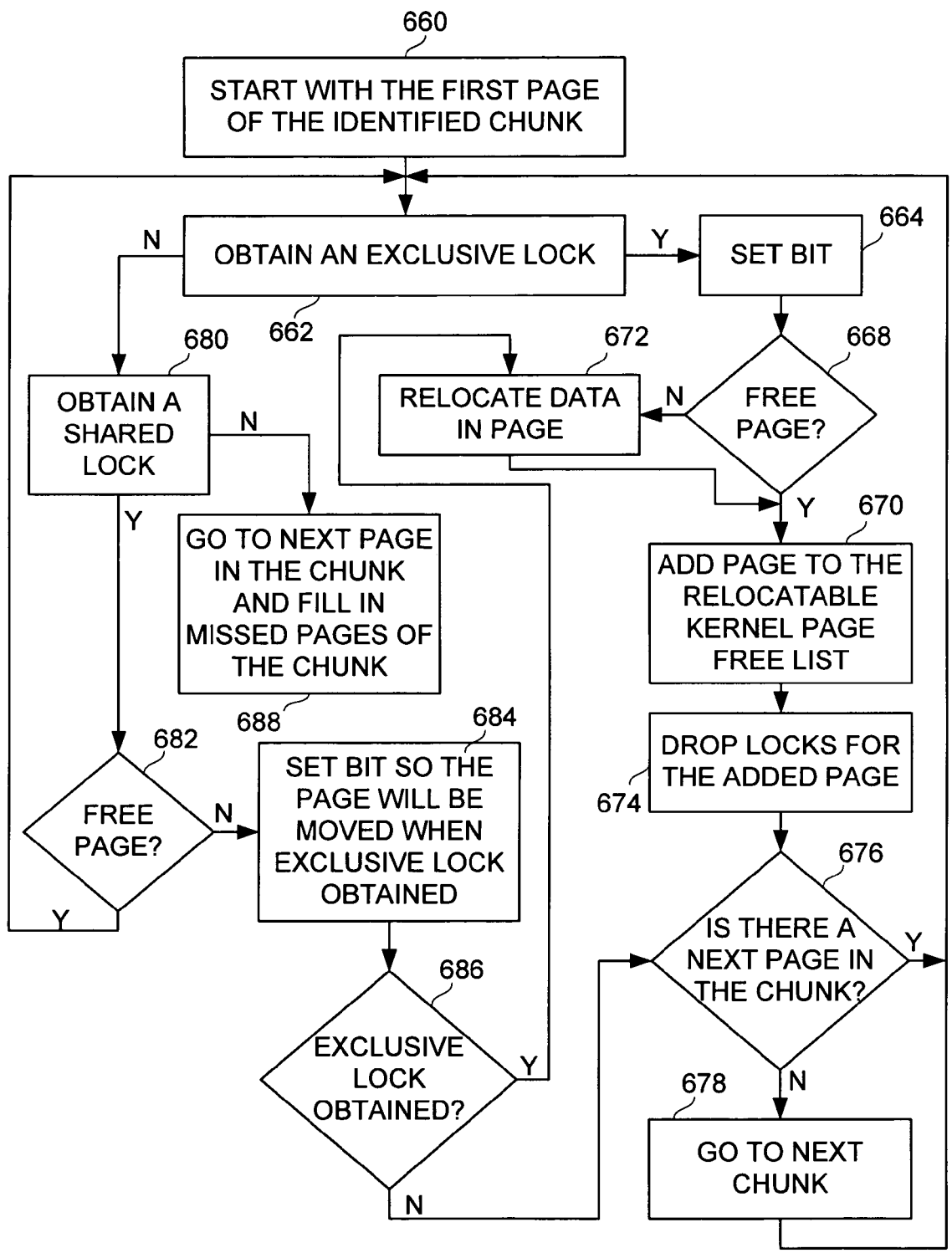
FIG. 6B is a flowchart diagram for populating a relocatable kernel page free list, in accordance with an embodiment of the invention.

Specifically, FIG. 6B is a flowchart diagram for populating the relocatable kernel page free list, in accordance with an embodiment of the invention. Operation 660 begins by starting with the first page of the identified chunk, as previously described in FIG. 6A. Then, instructions of operation 662 obtain an exclusive lock on the page. Obtaining the exclusive lock permits the move operation without losing or corrupting data. Specifically, the exclusive lock prevents mappings to the page by other processes of the operating system. Then, in operation 664, instructions set a bit of the page. The set bit identifies that the page is allocated for the relocatable kernel page free list.

In operation 668, a determination of whether the page is free is made. In particular, a free page has no mappings to the page. If the page is free, then in operation 670, instructions add the page to the relocatable kernel page free list. However, in operation 672 if the page is not free, meaning that there are mappings to the page, data in the page is relocated to another page outside the chunk. In addition, any mappings to the page are re-mapped to the page outside the chunk. Thereafter, the page is added to the relocatable kernel page free list.

After adding the page, instructions drop the locks for the added page. For example, for an exclusive lock, the exclusive lock is dropped, thus permitting the references to the page. Similarly, shared locks are dropped, as will be described in later operations. In operation 676, a decision is made to determine if there is a next page in the chunk. If not, then operation 678 has instructions to go to the next chunk in the physical address space. Alternatively, if there is a next page in the chunk, then the method repeats for the next page in operation 662 by obtaining an exclusive lock on the next page.

If an exclusive lock cannot be obtained for any page, then in operation 680, an attempt is made to obtain a shared lock. Specifically, the shared lock permits multiple mappings to the page. For example, a process may reference the page to write data. Thus, the process cannot be exclusive locked from referencing the page. If a shared lock is obtained and the page is free, as determined in operation 682, then the shared lock is upgraded to an exclusive lock in operation 680. However, if the page is not free, then instructions set a bit of the page so that page will be moved when an exclusive lock is obtained. For example, the process may be writing data to the page. After the process writes data to the page, the set bit of the page indicates that the page is to be allocated to the relocatable kernel page free list. Thus, after all references to the page cease, then an exclusive lock is obtained in operation 686.

If the exclusive lock is obtained, then the next operation is to relocate the data in the page. Alternatively, if the exclusive lock cannot be obtained, then the method proceeds to operation 676 to determine if there is another page of the chunk to move. If the page having the set bit is not added to the relocatable kernel page free list, then a process external to the method will recognize that the page having the set bit is to be added to the relocatable kernel page free list after all shared locks are released.

Returning to operation 680, if the shared lock cannot be obtained, then there is an exclusive lock on the page held by another process. The exclusive lock means that the mappings to the page cannot be re-mapped. Thus, in operation 688, the method proceeds to go to the next page of the chunk and fill in the missed pages of the chunk. Specifically, if the page cannot be shared, then the page does not have the set bit and is not identified for addition to the chunk. Thus, the chunk has a page gap. Multiple page gaps in the chunk can exist during the population of the relocatable kernel page free list. Thus, another process external to the method executes to fill in the page gaps. Specifically, the process generates a list of the page gaps in the relocatable kernel page free list and attempts to obtain an exclusive lock for each page. The process repetitively attempts to obtain an exclusive lock until successful. Once successful, the set bit of the page is enabled and the page is added to the relocatable kernel page free list. In this way, all the page gaps are filled and the chunk permits the allocation of contiguous free pages.

After populating the relocatable kernel page free list, requests for relocatable kernel memory are satisfied from the relocatable kernel page free list. Similarly, requests for nonrelocatable kernel memory are satisfied from the nonrelocatable kernel page free list and requests for user memory are satisfied from the user page free list. Further, to continually satisfy the request, a process maintains an acceptable amount of free pages in each page free list. Thus, by initially allocating the three types of pages, the pages are homogenized, thereby permitting the defragmentation of kernel memory.

The operations described are purely exemplary and imply no particular order. Further, the operations can be used in any sequence and can be partially used. For example, multiprocessing systems and pipelined systems can perform multiple operations in different order. Moreover, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of defragmenting memory, comprising:
   identifying a chunk of physical address space, the chunk having a plurality of pages, each page of the plurality of pages being identified by a page frame number;
   creating a relocatable kernel page free list;
   adding the page frame numbers of each of the plurality of pages from the chunk to the relocatable kernel page free list; and
   assigning page frame numbers from the relocatable kernel page free list to each request for relocatable kernel pages, such that relocatable kernel pages are assigned to the chunk of physical address space that is to be contiguously populated with relocatable kernel pages.

2. The method of claim 1, wherein adding the page frame numbers further includes setting an identifier that identifies each of the plurality pages for addition to the relocatable kernel page free list.

3. The method of claim 1, wherein adding the page frame numbers further includes relocating data of each of the plurality of pages that are not free.

4. The method of claim 3, wherein pages that are not free have mappings to the pages.

5. The method of claim 1, wherein adding the page frame numbers further includes obtaining an exclusive lock for each of the plurality pages to be added to the relocatable kernel page free list.

6. The method of claim 5, wherein obtaining the exclusive lock further includes dropping the exclusive lock after adding a page to the relocatable kernel page free list.

7. The method of claim 1, wherein adding the page frame numbers further includes setting the identifier after obtaining a shared lock to add a page to the relocatable kernel page free list.

8. The method of claim 1, wherein adding the page frame numbers further includes creating a page gap in the chunk, the page gap being filled by a process.

9. The method of claim 8, wherein creating the page gap in the chunk further includes processing the chunk to identify the page gap for filling.

10. The method of claim 1, further comprising:
    processing additional chunks of physical address space, the processing being configured to add page frame numbers of each page corresponding to particular ones of the additional chunks to the relocatable kernel page free list.

11. The method of claim 10, further comprising:
    continuing to assign page frame numbers from the additional chunks identified in the relocatable kernel page free list to additional requests for relocatable kernel pages.

12. The method of claim 1, wherein identifying the chunk of physical space further includes selecting a first page of a user page free list.

13. The method of claim 12, wherein selecting the first page of the user page free list further includes designating the first page for the relocatable kernel page free list by setting a bit.

14. The method of claim 1, wherein creating the relocatable kernel page free list further includes populating the relocatable kernel page free list from the user page free list.

15. An apparatus for defragmenting memory, comprising:
    means for identifying a chunk of physical address space, the chunk having a plurality of pages, each page of the plurality of pages capable of being identified;
    means for creating a relocatable kernel page free list;
    means for adding the page of each of the plurality of pages from the chunk to the relocatable kernel page free list; and
    means for assigning a page from the relocatable kernel page free list to each request for relocatable kernel pages, such that relocatable kernel pages are assigned to the chunk of physical address space that is to be contiguously populated with relocatable kernel pages.

16. The apparatus of claim 15, further comprising:
    means for processing additional chunks of physical address space, the processing being configured to each page corresponding to particular ones of the additional chunks to the relocatable kernel page free list.

17. The apparatus of claim 16, further comprising:
    means for continuing to assign pages from the additional chunks identified in the relocatable kernel page free list to additional requests for relocatable kernel pages.

18. An apparatus for defragmenting memory, comprising:
    a physical memory logically represented as a physical address space, the physical address space having chunks, wherein each chunk includes a plurality of pages, each page of the plurality of pages being identified by a page frame number;
    a processor coupled to the physical memory, the processor being in communication with the physical address space, the physical address space further being in communication with a relocatable kernel page free list, wherein the relocatable kernel page free list is populated by adding the page frame numbers of each of the plurality of pages from the chunk to the relocatable kernel page free list; and
    a communication bus coupled to the processor and the physical memory, wherein the physical memory permits the assignment of page frame numbers from the relocatable kernel page free list to each request for relocatable kernel pages, such that relocatable kernel pages are assigned to the chunk of physical address space that is to be contiguously populated with relocatable kernel pages.

19. The apparatus of claim 18, wherein each page of the relocatable kernel page free list includes a relocatable kernel page free list identifier configured to permit the addition of each page to the relocatable kernel page free list.

20. The apparatus of claim 17, wherein the chunks are located within a relocatable partition of the physical address space.

* * * * *